(12) United States Patent
Fairchild

(10) Patent No.: US 6,212,560 B1
(45) Date of Patent: Apr. 3, 2001

(54) DYNAMIC PROXY SERVER

(75) Inventor: Steven E. Fairchild, Harris County, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/075,298

(22) Filed: May 8, 1998

(51) Int. Cl.[7] .................................................. G06F 13/00
(52) U.S. Cl. ..................... 709/223; 709/224; 709/226; 709/220; 709/221; 709/222; 709/227
(58) Field of Search .................................. 709/223, 220, 709/221, 224, 226, 227, 201, 203, 225

(56) References Cited

U.S. PATENT DOCUMENTS

| 5,623,601 | * | 4/1997 | Vu .......................................... 713/201 |
| 5,727,159 | * | 3/1998 | Kikinis ................................ 709/238 |
| 5,734,865 | * | 3/1998 | Yu ........................................ 395/500 |
| 5,774,660 | * | 6/1998 | Brendel et al. ..................... 709/201 |
| 5,862,348 | * | 1/1999 | Pedersen ............................. 709/229 |
| 5,884,025 | * | 3/1999 | Baeher et al. ....................... 709/201 |
| 5,974,566 | * | 10/1999 | Ault et al. ............................. 714/15 |
| 5,996,010 | * | 11/1999 | Leong et al. ........................ 709/223 |
| 6,003,077 | * | 6/1998 | Bawden et al. ..................... 709/223 |
| 6,003,084 | * | 12/1999 | Green et al. ........................ 709/227 |
| 6,026,085 | * | 2/2000 | Chau et al. ........................... 370/352 |
| 6,049,820 | * | 4/2000 | Murphy, Jr. et al. ............... 709/203 |

OTHER PUBLICATIONS

TCP/IP Illustrated vol. 1, The Protocols by W. Richard Stevens (pp. 12–13), 1994.*

* cited by examiner

Primary Examiner—Glenton B. Burgess
Assistant Examiner—Abdullahi E. Salad
(74) Attorney, Agent, or Firm—Akin, Gump, Strauss, Hauer & Feld, LLP

(57) ABSTRACT

A dynamic proxy server (DPS) including client logic that is capable of communicating with a plurality of other server modules via corresponding internal HTTP ports, proxy logic that is capable of communicating with the other server modules via the client logic, and server logic including a communication socket. The server logic attempts to bind its socket to a master TCP port, and if successful, operates to proxy communications between the other server modules and the master port via the proxy logic. If the attempt to bind the socket to the master port is unsuccessful, the server logic binds the socket to one of a plurality of internal ports. The DPS interfaces a functional processing component (FPC) to form a dynamic processing module (DPM). In a system including a plurality of DPMs, one DPM serves as master and the other DPMs serve as secondary DPMs. Each DPM is capable of operating as master and includes watchdog logic that periodically causes the server logic to attempt to bind to the master port. In this manner, if the master DPM drops out, a first one of the other DPMs bind to the master port and operates as the master DPM.

20 Claims, 9 Drawing Sheets

DYNAMIC PROXY SERVER

FIELD OF THE INVENTION

The present invention relates to network management, and more particularly to a method and system that uses a plurality of dynamic proxy servers so that any one of several server modules in a system may function as a master server that controls a master port to proxy requests via internal ports to the remaining server modules.

DESCRIPTION OF THE RELATED ART

In computer network environments, it is advantageous to manage the various software and hardware components coupled to the network from a central location or from a remote location, such as the system manager's office. Such central or remote management of a network is commonly accomplished using industry standard protocols, such as the Simple Network Management Protocol (SNMP) or the Desktop Management Interface (DMI). SNMP provides a reliable and well-known mechanism for remotely controlling network devices, it requires the use of specialized management consoles. These consoles are typically expensive and were generally restricted to only those situations where the cost and training can be justified. DMI is a proprietary system that is deficient for similar reasons.

There is an industry-wide trend for considering network management across a network using Internet technology such as the World Wide Web (WWW), which is an Internet technology that is layered on top of the basic Transmission Control Protocol/Internet Protocol (TCP/IP) services. Other Internet technology concepts include the HyperText Transfer Protocol (HTTP), the Universal Resource Locator (URL), and the HyperText Markup Language (HTML). Such technologies are widespread and use of the various Internet protocols is growing.

Unfortunately, such technologies were not designed for purposes of network management and suffer from many deficiencies. For example, there are a limited number of TCP/IP ports, so that the standards body responsible for assigning the ports do not allow a single company or entity to obtain more than a single TCP/IP port for a single application. A single port has forced a solution to include a communication protocol manager (such as an HTTP server) with modules plugged into the manager to provide the desired functionality. A protocol manager with plug-in modules may be sufficient for simple applications. However, for more complex solutions, such as management, a mechanism must be included for managing the addition or removal of modules and for allowing the modules to communicate with each other and external entities. The result is that all modules are executing in the same process space, so that any programming errors (memory leaks, access violations, etc.) introduced by one module can potentially affect all modules. This subverts modern operating system mechanisms for isolating and gracefully managing these programming errors. As the size and complexity of the plug-in module solution increases, and as the implementation and support for the solution is dispersed, the opportunity for programming errors caused by interaction between modules increases dramatically.

It is desirable to provide remote network management across an intranet or the Internet using a web browser while keeping at least the functionality and flexibility of SNMP or DMI. It is also desired to provide a fault tolerant design that leverages operating system mechanisms to allow for graceful removal of modules with programming errors from a management system without impacting the other modules. It is also desirable to provide a flexible management system that allows loading and unloading of different functional modules, such as fault management, configuration management, software distribution, etc., without the need for a fixed configuration or administration of the modules and without disrupting system operation.

SUMMARY OF THE INVENTION

A dynamic proxy server according to the present invention includes client logic that is capable of communicating with at least one server module via an internal port, proxy logic that is capable of communicating with the server module via the client logic, and server logic including a communication socket. The server logic attempts to bind its socket to a master port, and if successful, operates to proxy communications between the server module and the master port via the proxy logic. If the attempt to bind the socket to the master port is unsuccessful, the server logic binds the socket to one of a plurality of internal ports. The client logic is capable of communicating with a plurality of server modules that are bound to corresponding internal ports, where the proxy logic is capable of communicating with each of the server modules via the client logic. The server logic operates to proxy communications between the server modules and the master port via the proxy logic.

In this manner, the dynamic proxy server operates as a master proxy server to enable communication between the master port and each of the secondary server modules. Any of the secondary server modules may drop out or fail without affecting operation of the master server or the remaining secondary servers. In a communication system according to the present invention, each of the secondary server modules may comprise dynamic proxy servers, so that any of the dynamic proxy servers are capable of operating as the master server. The remaining proxy servers are secondary servers that communicate with the master port via the master server. If the master server fails or drops out, any other dynamic proxy server is able to bind to the master port and operate as the master server.

The dynamic proxy server may include functional processing component (FPC) dispatch logic to enable communications between the server logic and an FPC. The combination of a dynamic proxy server and an FPC is referred to as a dynamic proxy module (DPM). The FPC may be used, for example, to retrieve information about the state of a managed system, such as a computer system or the like. There are no restrictions, however, as to the type of processing that a given FPC performs or the nature of the data that is returned or the corresponding actions that are taken. For example, FPCs may be used for purposes of software version control, software distribution, instrumented management, configuration management, or any other function of the computer system that is desired to be remotely controlled or monitored. Preferably, the interface between the dispatch logic and the functional processing component comprises an internet server application programming interface (ISAPI).

Memory may be provided for storing presence and communication information about each active dynamic proxy server. The proxy logic may write presence information into the memory upon initialization, so that the memory includes presence information about each active proxy server. The proxy logic of the master server reads the presence information to identify the presence of other active proxy servers. Also, the proxy may write specific communication information into the memory upon initialization, so that the memory includes the communication information about each active proxy server. The proxy logic of the master server reads the communication information to enable proxy communications for the other active proxy servers.

In a more specific example, a central configuration file is updated by each dynamic proxy server upon initialization to include specific information about that proxy server. The master proxy server reads the central configuration file to determine the presence of all active secondary proxy servers. An specific configuration file may be provided for each proxy server, where each specific configuration file contains the information required to perform a proxy operation to that proxy server. The central configuration file preferably includes an identification value to enable the master server to locate and read the specific configuration file for every other active server to enable proxy operations.

The dynamic proxy server may also include watchdog logic that causes the server logic to periodically attempt to bind the socket to the master port if the socket is bound to an internal port. In this manner, if multiple dynamic proxy servers are active, each secondary server periodically attempts to bind to the master port. An operating system is provided to control access to the master port and the internal ports. The operating system preferably gives the master server exclusive control of the master port. Although the master port is exclusively controlled by the master proxy server, the master proxy server may drop out or otherwise fail, which would otherwise disable the secondary servers. The watchdog logic ensures that one of the secondary proxy servers takes over as the new master when it attempts to bind to the master port. In that event, the new master retrieves the presence and communication information of the remaining proxy servers to perform as the master server.

In the preferred embodiment, the server logic and the client logic each operate according to HyperText Transfer Protocol (HTTP), and each of the ports including the master port and the internal ports comprise Transmission Control Protocol (TCP) ports. In this manner, all communications with the master and secondary servers is through a single TCP port. A browser operating on a client system is able to access each of the FPCs of a computer system through the TCP port.

It is now appreciated that a the use of dynamic proxy servers (DPSs) within dynamic proxy modules (DPMs) provides a fault tolerant design that leverages operating system mechanisms to allow for graceful removal of any DPM with programming errors from a management system without impacting the other DPMs. The present invention provides a flexible management system that allows loading and unloading of different functional processing components (FPCs), such as fault management, configuration management, software distribution, etc., without the need for a fixed configuration or administration of the DPMs and without disrupting system operation.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENTS

Figure 1:
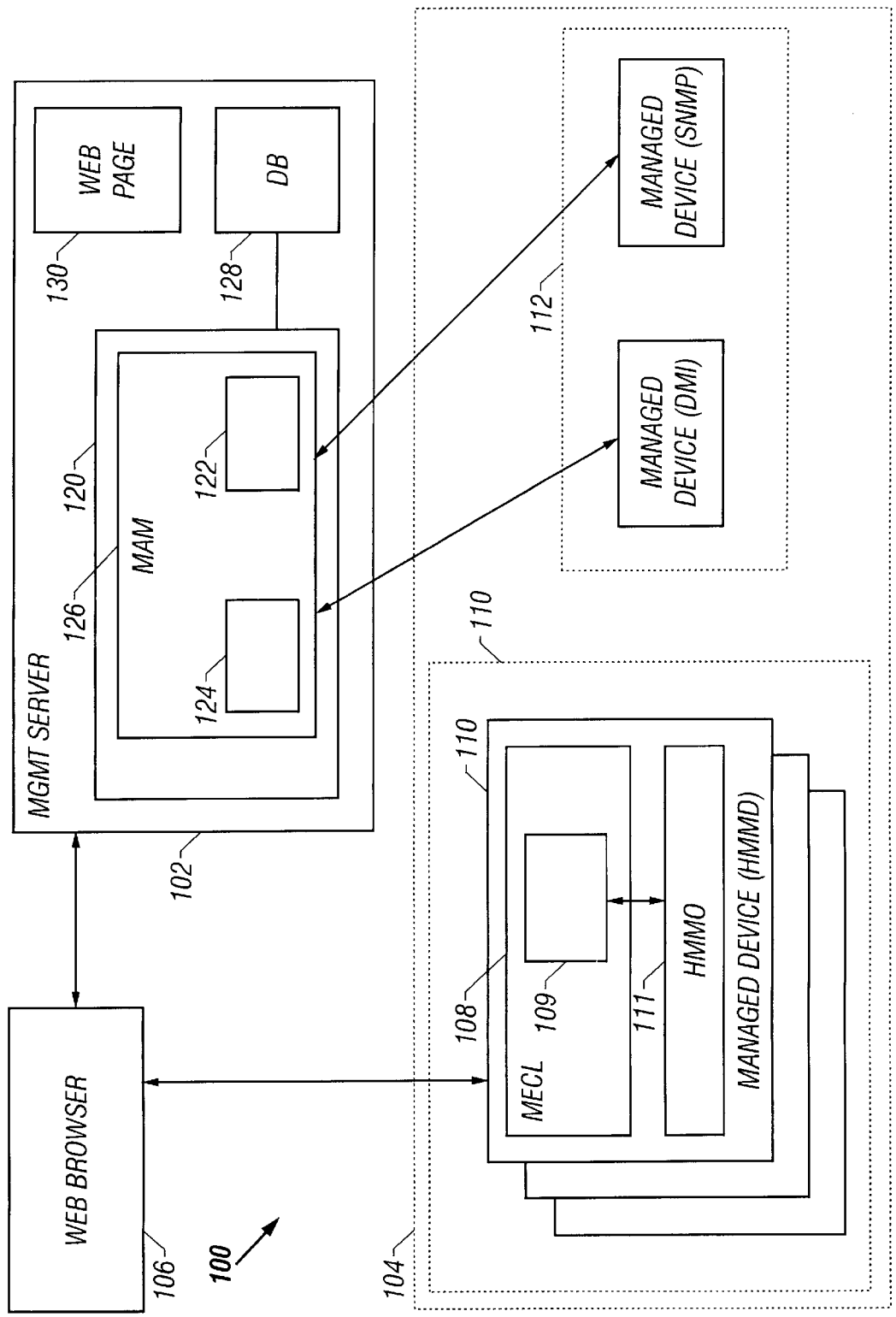
FIG. 1 is a block diagram of a web-based management network according to the present invention.

Referring now to FIG. 1, a block diagram of a web-based management network 100 is shown. A management system according to the present invention, such as the management network 100, enables management of both hardware and software components over a network using Internet technology. The management network 100 includes a management server 102, one or more managed elements (including devices, systems, etc.) 104, and a client system 106 that are coupled together using any one or more network architectures or technologies, such as Ethernet®, ATM, Token Ring, etc. The management network 100 preferably supports the World Wide Web (WWW), which is an Internet technology that is layered on top of the basic Transmission Control Protocol/Internet Protocol (TCP/IP) services. The management network 100 may be any type of network or network topology such as a separate intranet, part of the Internet itself, an intranet with access via a gateway or firewall to the Internet, etc.

The managed elements 104 generally include computer systems, such as desktops, portables, personal computer systems (PCs), servers, workstations, etc. as well as other networking devices, such as switches, repeaters, hubs, network interface cards (NICs), etc. The managed elements 104 are generally divided into two different types, including web-enabled devices or Hyper-Media Managed Devices (HMMDs) 110 and legacy devices 112. The legacy devices 112 include those implemented with the Simple Network Management Protocol (SNMP), the Desktop Management Interface (DMI), or similar type management systems known to those skilled in the art The HMMDs 110 each include one or more management agents called Hyper-Media Managed Objects (HMMO) 111, described further below. In the preferred embodiment, the HMMDs 110 each convert management data into a form that may be browsed using Internet technology, which may incorporate TCP/IP, Universal Resource Locator (URL), HyperText Transfer Protocol (HTTP), HyperText Markup Language (HTML), JavaScript, etc. A managed element communication layer (MECL) 108 including one or more servers 109 is provided at the front end of the HMMOs 111 for providing security of and access to management data of the corresponding HMMD 110. The servers 109 preferably operate as HTTP servers, and a separate server 109 is loaded and operated within the MECL 108 for each installed HMMO 111.

The client system 106 supports TCP/IP and includes a web browser for accessing and displaying management information from the management server 102 or any of the HMMDs 110. Examples of web browsers include MicroSoft® Internet Explorer for Windows 95® or Windows NT® and Netscape Navigator™ for Windows 95®, Windows NT® or HP/UX by Hewlett Packard. Other web browsers are contemplated as well. It is desired that the web browser support a scripting language, such as JavaScript or the like. Scripting language includes instructions interpreted by the browser to perform certain functions, such as how to display data, as further described below. The client system 106 generally replaces the management console of an SNMP management system, providing access to either the HMMDs 110 or the management server 102.

The management server 102 preferably uses an appropriate operating system (OS) such as Windows NT® or the like. The management server 102 also executes or otherwise operates as a Hyper-Media Management Application (HMMA) that provides management services for all of the managed elements 104 including the HMMDs 110 and the legacy devices 112. The management server 102 is the aggregation point for all management information of the management network 100 and provides a unified data model, in which data from the legacy devices 112 (SNMP, DMI, etc.) and data from the HMMDs 110 are consolidated into a common form. As such, the system and network management is unified and allows for easier integration and navigation between applications.

The management server 102 accesses management data from the HMMDs 110 and controls those devices using Internet technology. The HMMOs 111 operate as self-describing web agents that use common web-enabling components to provide registration, discovery, security and HTTP communications. The HMMO web agents render information in HTML, or in scripting language, or a combination of both, for viewing by a browser on the client system 106. The information may also be sent directly to the management server 102. The management server 102 also converts data from the legacy devices 112 into a form that may be browsed. For example, the management server 102 includes an SNMP converter 122 that converts SNMP-based data from SNMP managed devices to HTML, and a DMI converter 124 that converts DMI-based data from DMI managed devices to HTML. The management data from the managed elements 104 is stored in a management database 128 maintained on the management server 102. The SNMP converter 122 and the DMI converter 124 are examples of management applications 126, which are plug-in modules used to perform the functions or otherwise expand the capabilities of the HMMA. In this manner, the management server 102 is adaptable and flexible depending upon specific embodiment needs. The management server 102 also generates a home page 130 accessible by any appropriate web browser, such as that executing on the client system 106 or on the management server 102 itself.

The management server 102 provides a management foundation, which includes discovery of manageable devices, performance of event management and determination of device status and device groups. The database 128 preferably includes events, discovered devices, device status, user preferences and user-specified data that is actively monitored. The management server 102 performs management services to discover managed elements 104 of the management network 100 and to track the device state of all of the managed elements 104. The management server 102 discovers devices on the network using IP pinging for IP devices, SAP broadcasts for Internetwork Packet Exchange (IPX) devices and is extendable to enable other discovery mechanisms. The management server 102 periodically collects and saves configuration information in the database 128 in a common form regardless of whether the information was originally web-based, SNMP or DMI. For example, the management server 102 stores events and traps, and enables configuration of filters that ultimately generate queries that are used to select records from the database 128. The management server 102 also enables access of the database 128. The database 128 is preferably based on SQL Server by Microsoft® and is accessed via Java™ DataBase Connectivity (JDBC) or Object DataBase Connectivity (ODBC). SQL views are created to abstract the database 128 for reporting purposes.

The management server 102 enables the user to select a managed element 104 and view detailed information about that device. The management server 102 also enables a user to create device groups for business process views by filtering for selected devices and for selected events of those devices. The management server 102 handles events, such as SNMP traps and HTTP alerts, logs the events and allows a user to set event filters.

As described previously, the client system 106 includes a web browser for accessing and displaying management information from the management server 102 and any of the HMMDs 110. For example, the client system 106 sends an HTTP request in URL format to an HMMD 110, which is received by the MECL 108 of that HMMD. The MECL 108 accesses an index page for the HMMD 110, or the request is transferred to one of the servers 109 for a corresponding one of the HMMOs 111. As further described below, each HMMO 111 formulates or renders a corresponding web page using HTML and/or scripting language, which is passed back to the client system 106 for rendering and display via the server 109 of the MECL 108. The client system 106 accesses the home page 130 or data from the database 128 in a similar manner using TCP/IP and another URL. The management server 102 also performs security functions as further described below.

It is noted that the legacy devices 112 are managed and controlled by the management server 102 as usual according to the particular protocol supported (SNMP, DMI), so that the client system 106 might not necessarily have direct access. Nonetheless, the client system 106 has access and control of the legacy devices 112 via the management server 102. In this manner, it is appreciated that the client system 106 may be located anywhere on the Internet to access and control all of the managed elements 104 of the management network 100.

One of the primary goals of the management network 100 is to ensure a continuous operation of the network with as little down time as possible by isolating and solving problems. The management server 102 provides the base for software modules to expose and present the solutions to problems that exist within the management network 100. The act of finding problems, reducing the complexity in analyzing or diagnosing problems, and helping to resolve problems is referred to as Action Oriented Management (AOM). AOM comprises several concepts, including discovering and defining a problem, determining the course of action(s) to take based on the problem, and providing the resolution to the problem (either programmatically or as a list of steps for the user to follow).

There are many categories of actions that the management server 102 discovers. One action category is hardware fault detection, which is a category of actions identifying problems with hardware. Examples of hardware fault detection include failures or predictive failures on hard drives, processors, and memory. Most problem resolutions in the hardware fault detection category are simply identified steps that the user must follow to correct the problem. Tools in this category allow viewing of the problem. Another action is software configuration actions, which are actions that identify potential problems with software configurations. Software configuration actions use version control functionality along with the concept of a "software set". The user establishes a set of software that should be loaded on a server, and this category of actions identifies any deviations from that set, and differences between the set and the latest software. Problem resolution for software configuration allows distribution of software updates, along with retrieval of new software. Tools in this category include software distribution, Internet download, and report generation.

Another action category is thresholds, which are actions that track situations on the network identified by combinations of data The user has to configure the situations. The threshold tools allow the user to monitor management data and be notified whenever certain conditions arise. Another action category is service advisories, which are service advisories generated by the manufacturer of the management server 102. Tools for this category provide the details of the service advisory and may allow corrective action. Another action category is service advisories, which are actions that notify the user whenever an event is needed to be performed. Examples of this include backups, disk storage cleanup, etc. Tools in this category are user defined. Another action category is software updates, which are actions that notify the user whenever a new software update to software on their network becomes available on a corresponding web site. Tools for this category allow the new update to be fetched from servers setup on a user's network. Another action category is traps, which are actions that occur when an SNMP trap, an HTTP event, a DMI indication, or similar types of traps or events is received. The trap is turned into an action that is operated on just as any other action. The tools in this category allow the user to forward the trap to other management consoles, to page the user, provide correlation, etc.

Figure 2:
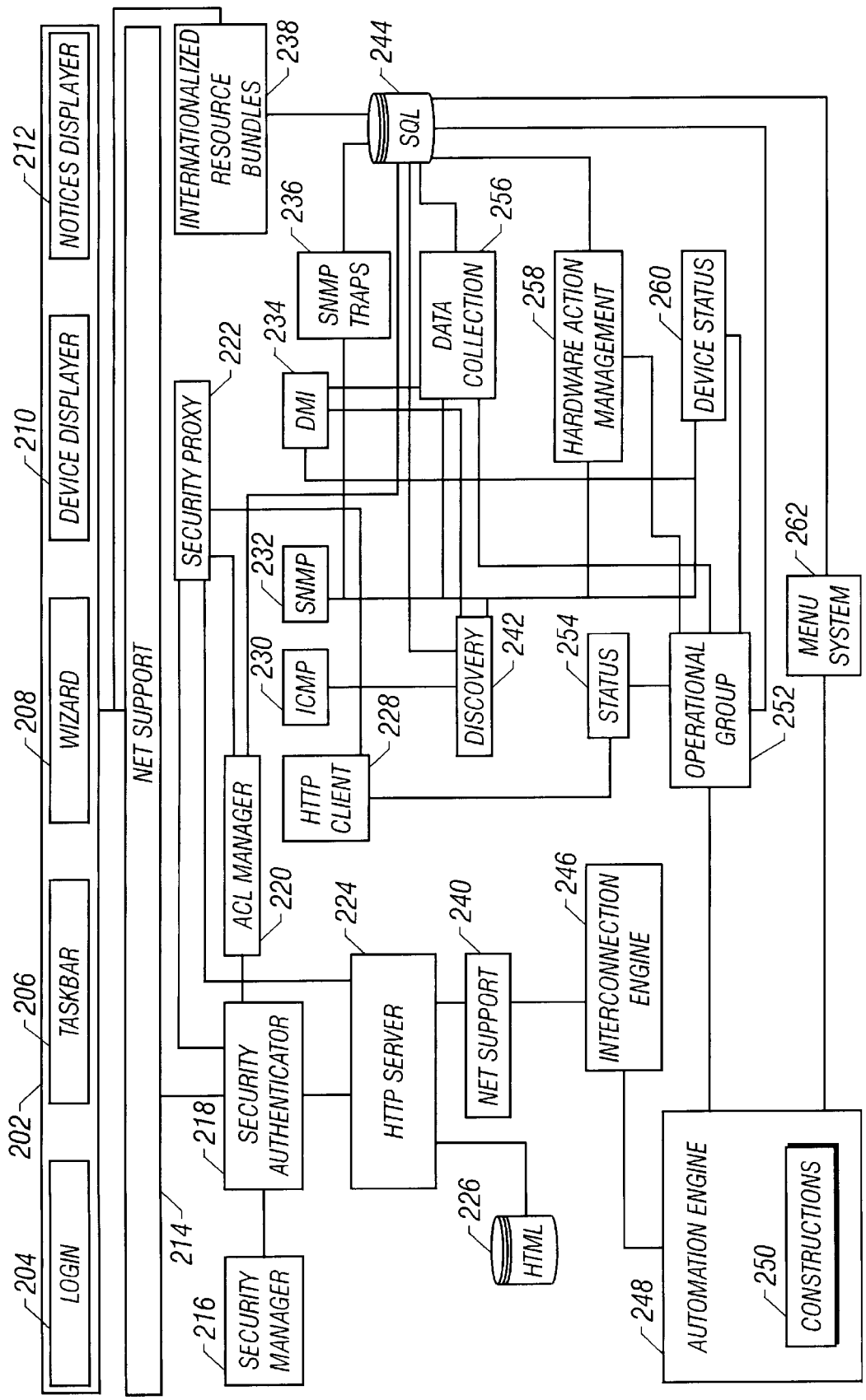
FIG. 2 is a block diagram of the management server of FIG. 1.

Referring now to FIG. 2, a more detailed block diagram of the management server 102 is shown. A User Interface 202 is provided with a plurality of modules that are preferably rendered on a web browser of the management server 102. The User Interface 202 includes a Login module 204, a Taskbar module 206, a Wizard module 208, a Device Displayer module 210 and a Notices Displayer module 212. The Login module 204 is a login applet which gains the user access to the management server 102. The Taskbar module 206 includes management server menus. The Wizard module 208 includes applets for guiding and assisting the user through tasks on the management server 102. The Device Displayer module 210 is an applet which displays information about selected devices. The notices Displayer module 212 is an applet which displays event-based information. A Net Support layer 214 interfaces the User Interface 202 and includes Java™ or JavaScript classes that underlie other components that handle asynchronous communications to and from the management server 102.

The management server 102 includes a Security Manager module 216, which manages creation, deletion and modification of user accounts. The Security Manager module 216 interfaces a Security Authenticator module 218, which checks incoming requests for proper access rights and denies access if appropriate. The Security Authenticator module 218 interfaces the Net Support module 214 and an Access Control List (ACL) Manager module 220, which manages the privileges associated with each type of user account. The ACL Manager module 220 and the Security Authenticator module 218 each interface a Security Proxy module 222, which proxies requests from the user's browser to web agents, adding necessary security information to avoid having to log in to each web agent.

The Security Authenticator module 218 and the Security Proxy module 222 each interface an HTTP Server module 224, which runs at an alternate port for special purpose enterprise management. The HTTP Server module 224 interfaces an HTML database 226, which includes miscellaneous HTML pages and scripts used by the User Interface 202 of the management server 102. The Security Proxy module 222 interfaces an HTTP Client module 228, which is used to initiate HTTP requests to other devices. An ICMP module 230 sends ICMP packets on the network to implement IP pinging. An SNMP module 232 is provided which includes SNMP communications modules. A DMI module 234 is provided which includes DMI communications modules. The SNMP module 232 interfaces an SNMP Traps module 236, which handles the reception of SNMP traps and converts them to management server notices. The User Interface 202 interfaces an Internationalized Resource Bundles module 238, which manages resource bundles for applets for different languages. The SNMP Traps module 236 and the Internationalized Resource Bundles module 238 each interface a SQL database 244, which includes discovery, device, activity and results information and corresponds to the management database 128. A Discovery module 242 interfaces the ICMP module 232, the SNMP module 232, the DMI module 234 and the SQL database 244. The Discovery module 242 finds devices on the management network 100 and identifies them.

The HTTP Server module 224 interfaces a Net Support module 240, which comprises a server side portion of communication to applets (Net Support in browser) that activates server functionality based on incoming requests, and returns results and other asynchronous notification information. The Net Support Module 240 interfaces an Interconnection Engine module 246, which is responsible for connecting together events with the listeners of the events. The Interconnect Engine module 246 has support for registering to receive events and for firing events. The Interconnect Engine module 246 interfaces an Automation Engine module 248, which loads constructions, fetches components and sets object properties to perform management functions. The Automation Engine module 248 supports conditional operations that affect the next operation performed, based on the results of a completing operation. The Automation Engine module 248 includes a Construction module 250, which operates as a listener of events composed of many components wired together to perform one management function or a portion of a management function.

The Automation Engine module 248 interfaces an Operational Group module 252, which accesses the SQL database 244, runs SQL queries periodically and performs the specified management functions upon addition or removal of a device or event from the result set. The HTTP Client module 228 and the Operational Group module 252 interface a Web Agent Status module 254, which performs a management function to track the status of web agents. The DMI module 234, the SNMP module 232 and the Operational Group module 252 interface a Data Collection module 256, which performs a management function to collect configuration data from devices and saves the configuration in the SQL database 244. The SNMP module 232 and the Operational Group module 252 interface a Hardware Action Management module 258, which performs a management function that takes further action to try and resolve hardware problems or check on whether the problem still exists. The Hardware Action Management module 258 accesses the SQL database 244. The DMI module 234, the SNMP module 232 and the Operational Group module 252 interface a Device Status module 260, which performs a management function that tracks the status of SNMP and DMI devices. A Menu System module 262 interfaces the Automation Engine module 248 and accesses the SQL database 244 and builds menus for the User Interface 202 based on user privilege, language and location.

Figure 3:
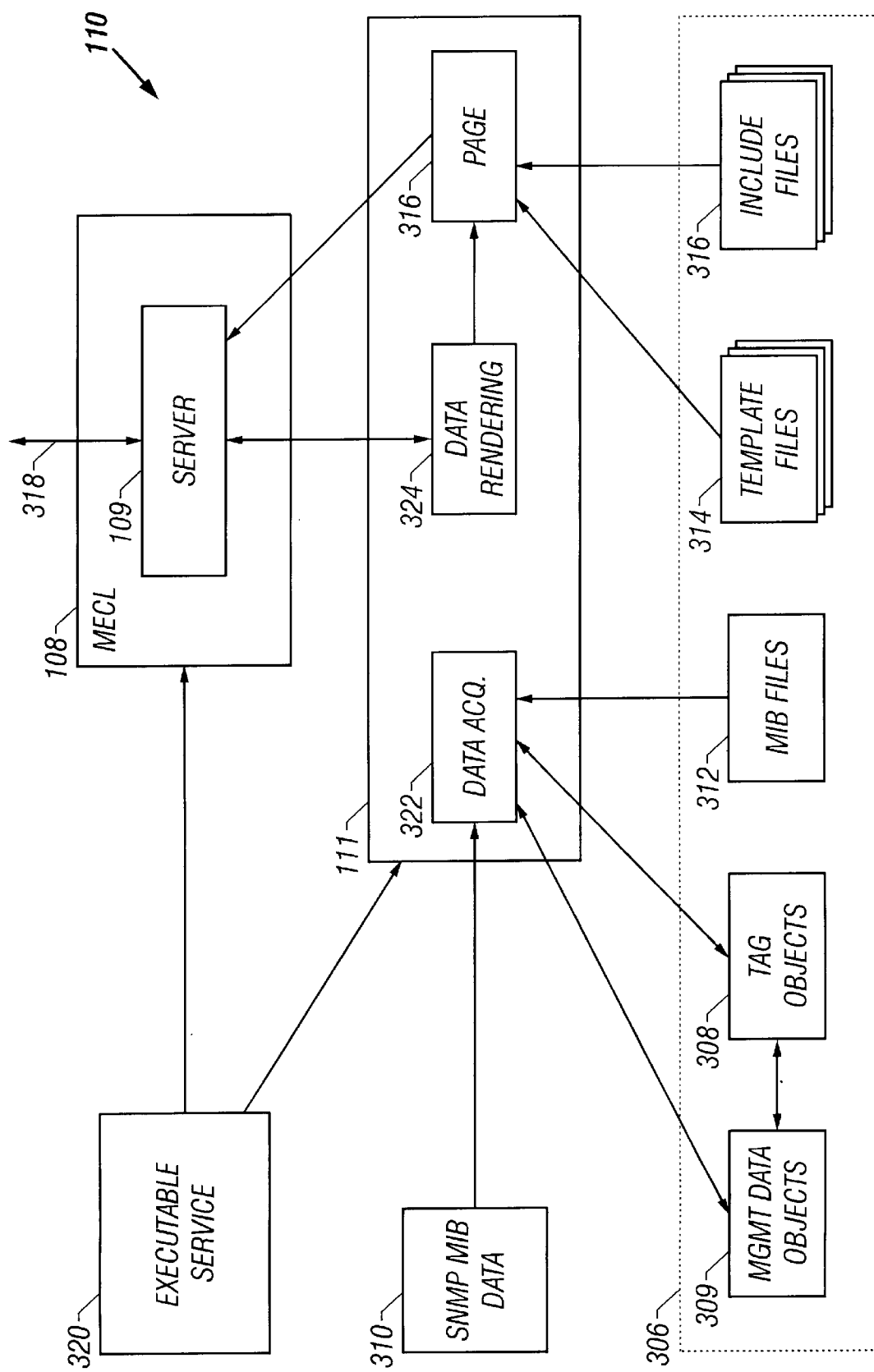
FIG. 3 is a block diagram of an exemplary managed device including an HTTP server and an exemplary web agent.

Referring now to FIG. 3, a more detailed block diagram is shown of an exemplary HMMD 110, which includes the MECL 108, the HTTP server 109, an exemplary web agent or HMMO 111 and memory 306. The memory 306 generally represents any type of memory, including magnetic media devices such as floppy disk, hard disk drivers, tape drivers, electronic memory devices such as random access memory (RAM), read only memory (ROM), or any type of memory device used to store programs, software, data. The memory 306 stores at least one MIB file 312, one or more templates pages (TPL) 314 and one or more include files 316. SNMP MIB data 310 generally represents a plurality of data values typically associated with a management information base (MIB), a MIB-2 database, etc. Each data value is retrieved using an SNMP call using a corresponding object identifier (OID) to a software module or a hardware device being managed, which returns an actual data value that corresponds to the OID. An executable module 320 is installed as a service, which, upon power-up, reset or initialization, loads the MECL 108 and registers any included HMMOs, such as the HMMO 111, with the MECL 108. The MECL 108 starts the server 109 to listen at one or more designated ports 318 for HTTP requests, such as requests for HTML pages or rendered pages to display. When a user connects to the port 318, the MECL 108 responds with an initial or default page, which includes one or more links for purposes of navigation.

Figure 4A:
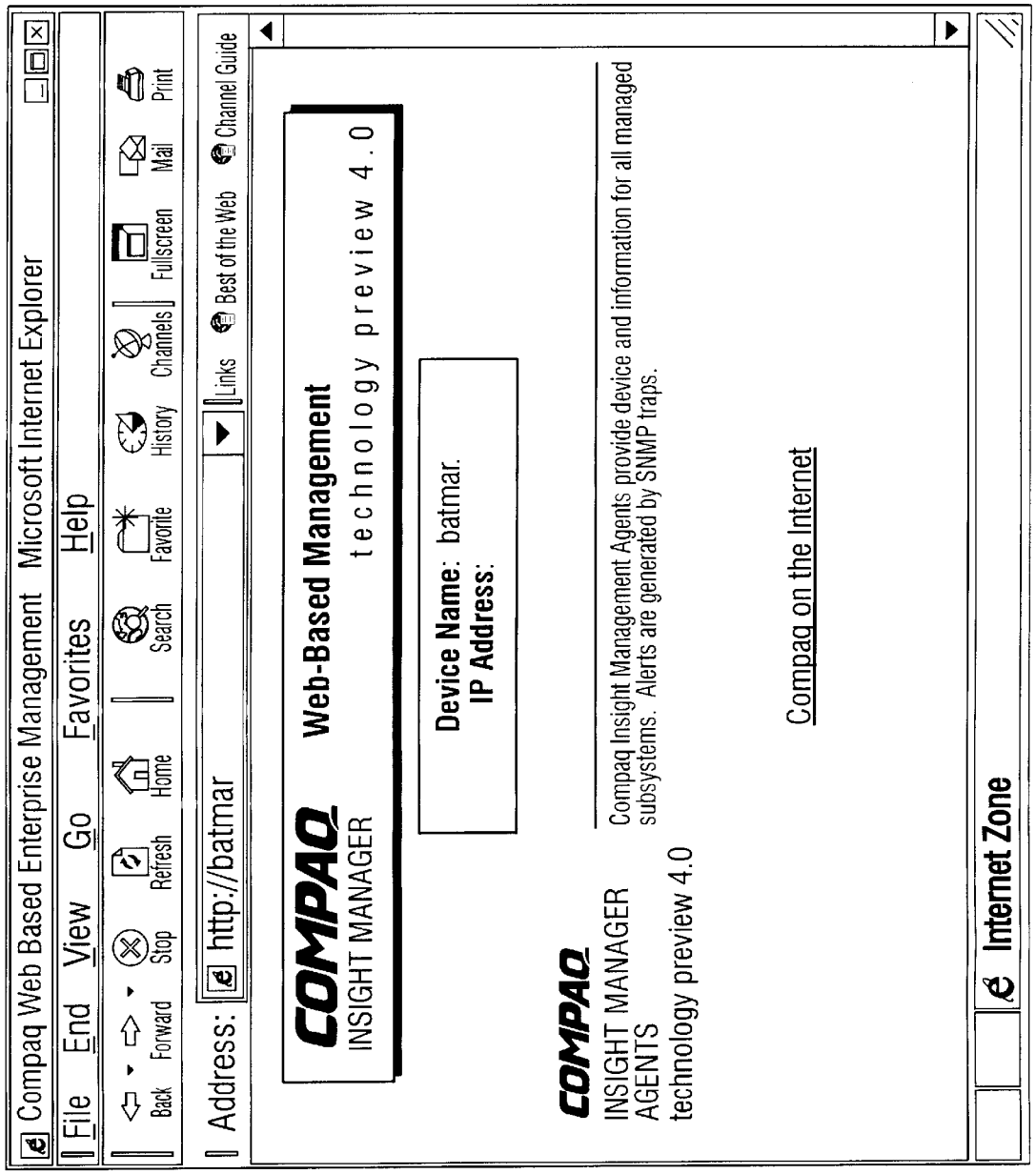
FIG. 4A is an exemplary default page implemented using HTML and scripting language as displayed by a browser running on the client system of FIG. 1.
Figure 4B:
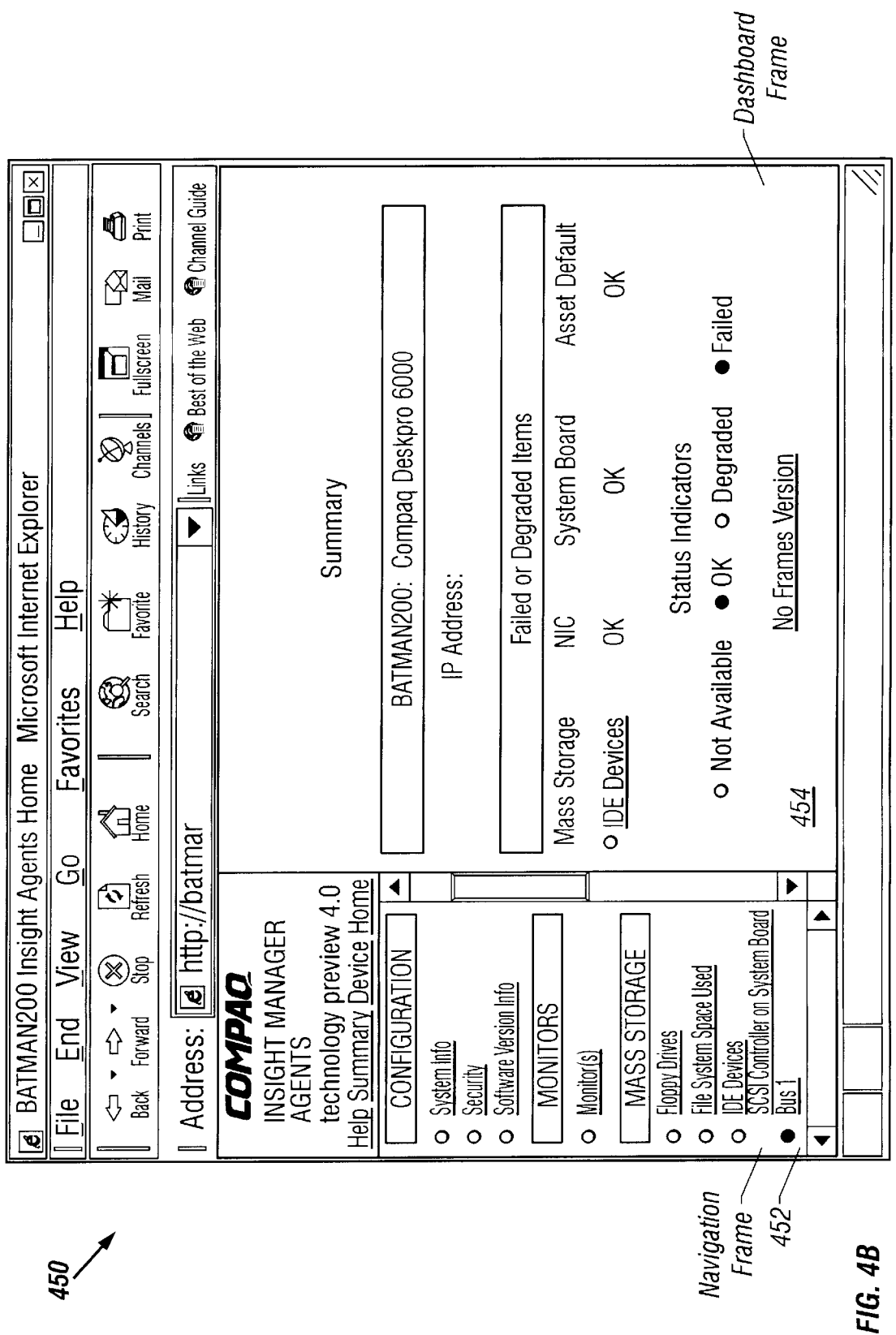
FIG. 4B is an exemplary navigation page including a navigation frame and a summary frame showing the details of the selected items in the navigation frame.

An exemplary default page 400 is illustrated in FIG. 4A, which may be implemented using HTML and scripting language and is rendered or interpreted by a browser, such as the browser running on the client system 106. One of the links, when selected, causes the MECL 108 to respond with a navigation screen. An exemplary navigation page 450 for a computer system is illustrated in FIG. 4B, which includes a navigation frame 452 showing the overall statuses of manageable hardware items with links to respective pages and a summary frame 454 showing the details of the selected items in the navigation frame 452. The information displayed in the navigation page depends on the particulars of the HMMD selected.

The navigation frame 452 of the navigation page 450 preferably includes a plurality of sections, such as a Configuration section, a Monitor(s) section, a Mass Storage section, a NIC section, an Expansion Boards section, a System Board section, an Asset Details section, a Batteries section if the client is Portable computer, etc. The Configuration section, for example, may include summary, system, security and software version information. System information may include, for example, product names, version numbers, descriptions, serial numbers, CPU (Central Processing Unit) types, CPU names, CPU speed(s), memory information such as related to RAM and ROM memory devices, system port information, keyboard information, video information, etc. Security information may include, for example, passwords, modes of operation, lock statuses, control parameters for various resources, etc. Monitor information may include, for example, size, type, condition, model number(s), serial numbers, dimensions, thermal operating parameters, operational conditions, status, etc. The Mass Storage section may include information related to file system space used, floppy drive(s), IDE (Integrated Device Electronics) devices, SCSI (Small Computer System Interface) controllers, etc., and provides more detailed information such as total space available, space used, manufacturers, disk types, model numbers, number of disk heads and sectors, etc. The Expansion Boards section may include information about expansion boards plugged into a particular computer, such as board names and types, slot numbers, DMA channels, Input/Output (I/O) memory base addresses, memory size parameters, etc. The Expansion Boards section may also include other system resource information The Batteries section, if applicable, includes information about the condition of the batteries, the manufacturer, the model number, the chemistry, etc.

The above listed sections and included information is not exhaustive and are only exemplary for computer systems. The particular sections and included information in a particular embodiment may depend upon the particular implementation and the included devices and resources. In general, the navigation frame 452 provides links to any type of manageable information, which is retrieved and displayed in the summary frame 454.

Referring back to FIG. 3, the HMMO 111 includes a data acquisition module 322 and a data rendering module 324. The MIB file 312 includes a list of data names and OIDs corresponding to the MIB data 310. When the HMMO 111 is initialized, the data acquisition module 322 reads the MIB file 312 and generates a collection of tag objects 308 and a plurality of management data objects 309, where the tag and management data objects 308, 309 are stored in the memory 306. Actual data is not pre-loaded or cached until it is requested. After the class objects are initialized, the MECL 108 and server 109 are loaded and given the appropriate configuration information. Next the Web Agent 320 registers the TPL file extension with the server 109, which waits for calls to the HttpExtensionProc call back function to process HTML page requests.

In the embodiment shown, the management data objects 309 retrieve the actual MIB data 310 using SNMP calls. Each management data object includes a MIB data name and OID. The tag objects 308 include a leaf tag object corresponding to each management data object, where the OID is passed to the corresponding leaf tag object. Each leaf tag object also includes a tag name. The tag objects 308 also include table tag objects and structure tag objects, where each table tag and structure tag object comprises a collection or list of one or more leaf tag objects. The data rendering module 324 uses a tag name to search the collection of tag objects 309, which returns a corresponding tag object or a reference to that tab object. The data rendering module 324 then uses the tag object to access the data values associated with that tag object. In particular, the tag object is a leaf tag or includes one or more references or links to one or more leaf tags, which further includes a reference or link to a corresponding management data object Each management data object, when called, returns the actual data value, which is passed to the data rendering module 324. The use of the MIB file 310 allows changes to made to the MIBs without requiring any code changes. This design also separates the data acquisition from the tag classes used to render the template files 314 so that other ways of retrieving the data can be used without rewriting the tag classes or rendering code. Changes to use a registry or DMI to retrieve the data only requires changes to the management data classes.

HTTP requests and replies are preferably handled through an interface similar to the Internet Server Application Programming Interface (ISAPI) standard for HTTP extension Dynamic Link Libraries (DLLs). A Web Agent HttpExtensionProc call back function is called each time a valid request is received by the server 109 for a TMP file or rendered page. An Extension Control Block (ECB) data structure is passed as a parameter in the HttpExtensionProc call that contains information needed to process the HTTP request. The template file is then rendered, as described further below, and a HTM file or rendered page is produced. The rendered page file is then sent using the ServerSupportFunction of the ECB passing the HSE_REQ_SEND_GENERIC_FILE flag and the name of the rendered page. Image files included in the template files, such as Graphics Interchange Format (GIF) files, are returned by the server 109. The location of the files is specified in the configuration information when the server is loaded 109.

When the HttpExtensionProc(OBJECT-PARA is called, the OBJECT-PARAM contains the type of request: GET or POST. Requests for non-form pages are considered a GET request and the OBJECT-PARAM contains the name and path of the file being requested. Template files have the same name as the returned pages except that they have a "TPL" file extension instead of "HTM". The MECL 108 is queried for the security information to set the read and write levels of the data groups to determine if the user can view or change the data. The appropriate template file name is processed by the HMMO 111. Processing includes replacing the data tags in the template with actual data or scripting objects to produce the rendered page, which is then returned to the HTTP server 109 using the ECB function.

When the MECL 108 receives a request for an HTML page or rendered page via the server 109, such as by selection of a link from the navigation frame 452, for example, the request is processed and redirected to the appropriate HMMO, such as the HMMO 111. When the HMMO 111 receives a request for a page from the MECL 108, the data rendering module 324 reads a corresponding one of the template files 314 and generates a corresponding page by transferring or copying HTML lines from the retrieved template file into the page, by replacing the data tags, or HTML tag objects, in template file with actual data and/or scripting objects or constructors, and by replacing any include file entries with corresponding include files. An include file entry in the template file is a reference or pointer to one of the include files 316, which is written or rendered into the page. In this manner, the HMMO 111 generates a rendered page 326, which is returned to the MECL 108. The MECL 108 returns the rendered page 326 to the client system 106 via the HTTP server 109.

When the data rendering module 324 module reads a data tag or HTML tag object, it searches the tag objects 308 for the corresponding tag object using a tag name found in the data tag. The tag object is returned. If the tag object is for a single data value, the data rendering module 324 calls the corresponding management data object via the tag object, which returns the actual data. The data rendering module 324 replaces the data tag with the actual data. If the tag object is for a structure or table comprising one or more data values, the data rendering module 324 generates a scripting object or constructor, which includes a constructor object and one or more constructor calls with actual data. Each constructor call includes one or more data values, where, for each data value, the data rendering module 324 calls the corresponding management data object via the tag object and a leaf tag object, which returns the actual data.

Figure 5:
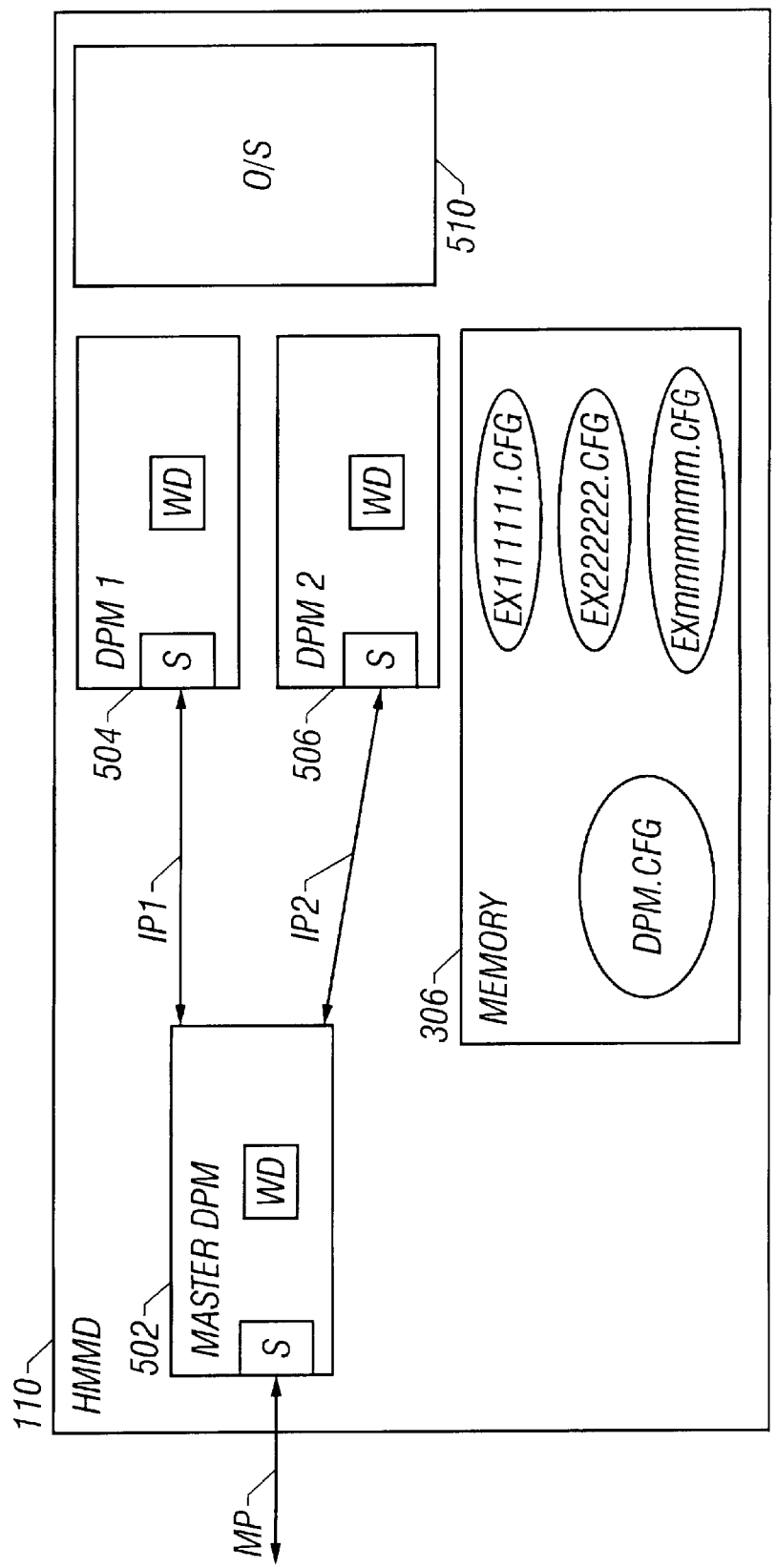
FIG. 5 is a block diagram showing a managed device including a plurality of dynamic proxy modules, each including a dynamic proxy server.

Referring now to FIG. 5, a block diagram is shown of an HMMD 110 including a plurality of dynamic proxy modules (DPMs). Each DPM includes a dynamic proxy server (DPS) and one or more functional processing components (FPCs), as further described below. The server 109 may be implemented to operate as a DPS, where the HMMO 111 is an FPC so that the combination of the server 109 and HMMO 111 forms an example of a DPM within the HMMD 110. The HMMD 110 is shown having three DPMs, 502, 504 and 506. Each DPM 502, 504 and 506 includes a socket S for communicating as a server to an external client. The socket S of the DPM 502 is shown bound to a master port (MP) of the HMMD 110, which could comprise the link to the client system 106 as shown in FIG. 1. The HMMD 110 typically includes only one MP, although it may further include several DPMs, such as the DPMs 502, 504 and 506, where each DPM needs to ultimately communicate via the MP to external clients.

Because the DPM 502 is linked to the MP, it is referred to as the master DPM and operates as a proxy server for the other, secondary DPMs 504 and 506. The socket S of the secondary DPM 504 is bound to an internal port IP1 and the socket S of the secondary DPM 506 is bound to another internal port IP2. FIG. 5 illustrates that the secondary DPMs 504 and 506 each communicate with the master DPM 502 via the internal ports IP1 and IP2, respectively. However, the secondary DPMs 504 and 506 communicate indirectly with external clients via the MP, where the master DPM 502 operates as a proxy server. The secondary DPMs 504 and 506 may also communicate with each other via the internal ports IP1 and IP2.

As described further below, each of the DPMs 502, 504 and 506 may operate as either a master or a secondary DPM. For example, if the master DPM 502 fails or drops out for any reason, either of the secondary DPMs 504 or 506 may bind to the MP and resume as the master DPM. Also, after the DPM 502 drops out, the secondary DPM 504 may bind to the port MP and become the new master DPM. In that case, the "new" master DPM 504 operates as a proxy server for the DPM 506, which remains as a secondary DPM. Further, if the "old" master DPM 502 is brought back online after the DPM 504 became the master, the DPM 502 becomes another secondary DPM and the DPM 504 operates as a proxy server for the DPMs 502, 506.

Each of the DPMs 502, 504 and 506 includes watchdog logic WD, which periodically causes each DPM to attempt to bind to the MP if not already so bound. Since the master DPM 502 is already bound to the MP, the WD of the DPM 502 is temporarily suspended. An operating system (O/S) module 510 with TCP/IP services executing on the HMMD 110 controls access to each of the ports, including the master port MP, the internal ports IP1 and IP2 and other internal ports. An example of an exemplary HMMD 110 is a computer system executing an O/S such as Windows NT® or Novell NetWare, although other suitable operating systems are contemplated. The O/S module 510 grants exclusive use of the MP to a master DPM, such as the master DPM 502, so that repeated attempts by the other DPMs 504 and 506 fail. However, if the master DPM 502 drops out, the MP is available to the first DPM that requests to bind to the MP, such as either DPM 504 or 506. As in the previous example, if the DPM 504 requests to bind its socket S to the MP after the current master DPM 502 drops out, the O/S module 510 grants the MP to the DPM 504, which becomes the new master.

The memory 306 of the HMMD 110 is used to store several configuration files that are used for purposes of controlling proxy server functions. A DPM.CFG configuration file is used to maintain configuration information for all of the active DPMs. A master DPM uses the DPM.DFG file to determine the presence of other active DPMs on the HMMD 110. Each DPM also includes a corresponding EXxxxxxx.CFG file, which contains specific information about the corresponding DPM. The information within each EXxxxxxx.CFG file is used by the master DPM to enable it to perform proxy operations for each secondary DPM. As shown in FIG. 5, a configuration file EX111111.CFG contains information about the DPM 504, a configuration file EX222222.CFG contains information about the DPM 506, and a configuration file EXmmmmmm.CFG contains information about the DPM 502.

Figure 6:
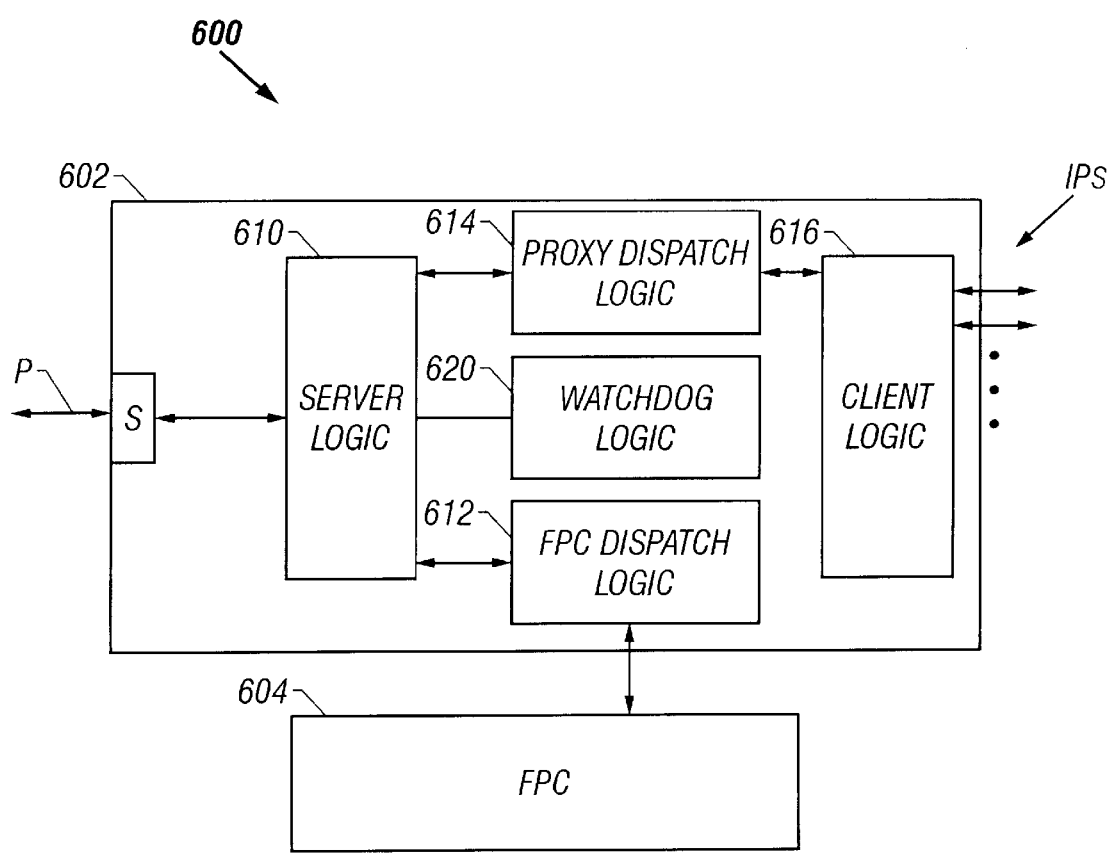
FIG. 6 is a block diagram showing an exemplary dynamic proxy module (DPM) that includes a dynamic proxy server (DPS) and a functional processing component (FPC)

FIG. 6 is a block diagram of an exemplary DPM, referred to as the DPM 600, which represents any of the DPM's 502, 504 or 506 of FIG. 5. The DPM 600 includes a dynamic proxy server (DPS) 602 coupled to an FPC (functional processing component) 604. As described above, the server 109 may comprise a DPS where the HMMO 111 comprises an FPC, the combination forming a DPM. The DPS 602 includes a socket S for binding to a port P, such as any of the TCP ports MP, IP1, IP2, etc. Server logic 610 interfaces the socket S and performs the functions of a server, such as an HTTP server. FPC dispatch logic 612 interfaces the server logic 610 and the FPC 604. Proxy dispatch logic 614 interfaces the server logic 610 and client logic 616, which preferably performs HTTP client functions to proxy requests to secondary DPMs via one or more internal ports IPs.

The HMMO 111, as an exemplary FPC, is used to retrieve information about the state of a managed system, such as the HMMD 110. There are no restrictions, however, as to the type of processing that a given FPC performs or the nature of the data that is returned or the corresponding actions that are taken. For example, FPCs may be used for purposes of software version control, software distribution, instrumented management, configuration management, or any other function of the HMMD 110 desired to be remotely controlled or monitored.

If the server logic 610 receives a request or command via the port P that targets the FPC 604, then the command is directed towards the FPC 604 via the FPC dispatch logic 612. In the embodiment shown, the FPC 604 is accessed by means of an Internet Server Application Programming Interface (ISAPI), where the DPS 602 presents an ISAPI interface to the FPC 604. ISAPI is a common web server back-end processing interface developed and used by Microsoft® in its Internet Information Server (IIS) as an alternative to the CGI (Common Gateway Interface). ISAPI programming, however is not limited to the Microsoft® IIS, or even to servers running the Windows 95® or Windows NT® operating systems. The present invention is not limited by the particular interface between the DPS 602 and the FPC 604.

If the DPM 600 is the master DPM, such that the socket S is bound to the MP of the HMMD 110, then any requests or commands received by the server logic 610 via the port P (or MP), and targeted to any secondary DPMs coupled to any of the IPs of the DPM 600, are sent to the proxy dispatch logic 614. The proxy dispatch logic 614 proxies the command or request to the targeted secondary DPM via the client logic 616 and the appropriate IP to which the targeted secondary DPM is coupled. If the DPM 600 is not the master DPM, then the socket S is bound to an available internal port IP, and communicates via the port P (IP). In that case, the master DPM proxies requests or commands received at the MP to a port IP, which is received by the server logic 610 of the secondary DPM 602. The DPM 602 passes the command or request to the FPC 604. Responses from the FPC 604 are transferred to the port P via the server logic 610 in either case. The proxy dispatch logic 614 and the client logic 616 are not used in secondary DPMs, although chaining of the DPS is contemplated.

The DPM 600 further includes watchdog logic 620 coupled to the server logic 610, where the watchdog logic 620 serves to monitor the port MP of the HMMD 110 if the DPM 600 is a secondary DPM. In particular, the watchdog logic 620 periodically queries, or attempts to bind to, the port MP to determine if the master DPM is still present. If the DPM 600 is the first DPM or the first to attempt to bind to the MP after the current master fails or drops out, then the DPM 600 binds to the MP and becomes the new master DPM.

Figure 7A:
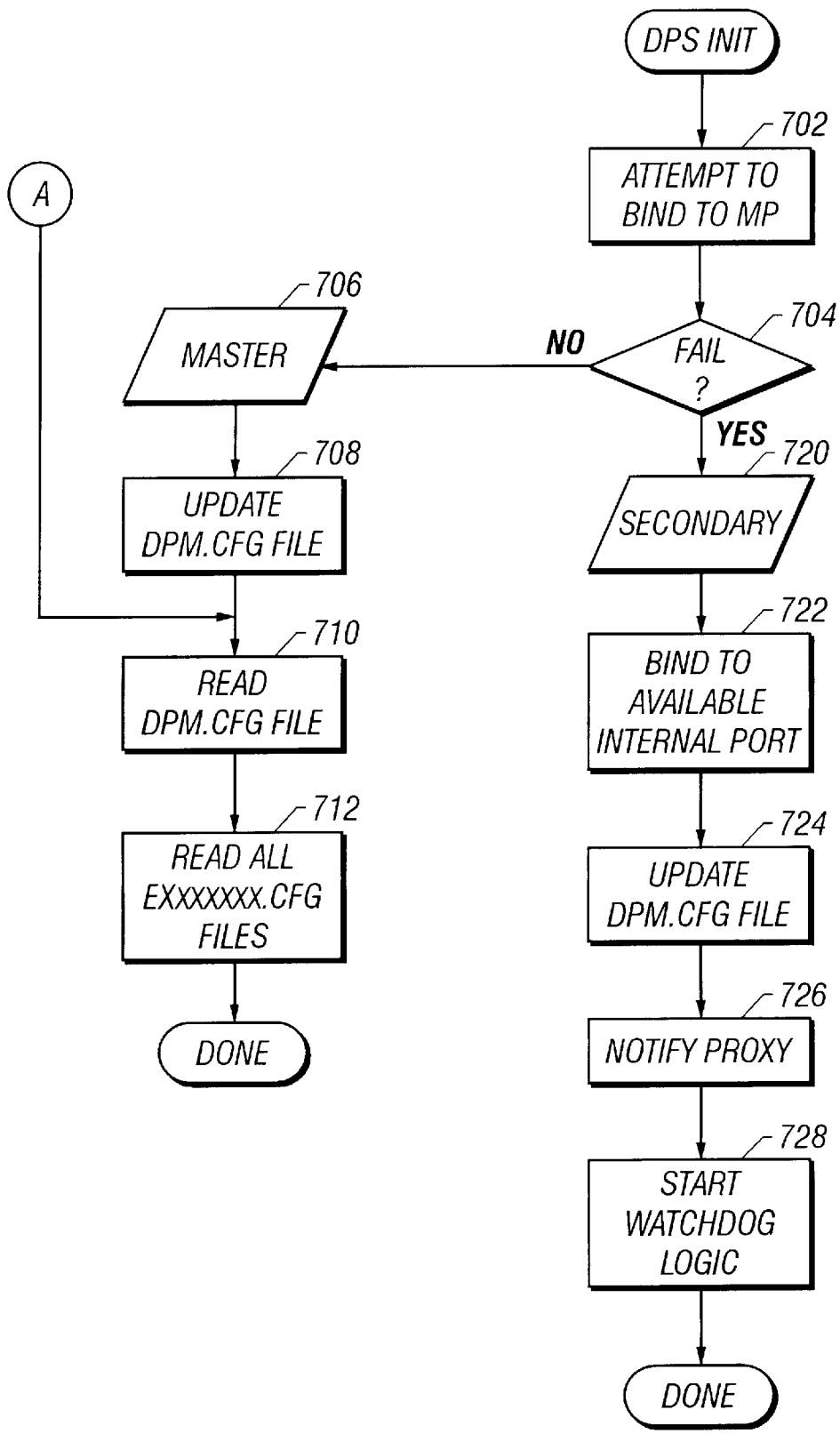
FIG. 7A is a flowchart illustrating an initialization procedure performed by each DPS when loaded, dynamically installed or upon startup of the managed device.

FIG. 7A is a flowchart diagram illustrating an initialization operation performed by the DPS 602 of the DPM 600, which represents any of the DPMs 502, 504 or 506. At first block 702, the DPS 602 attempts to bind to the MP by requesting exclusive access of the DPM from the O/S 510. At next decision block 704, it is determined whether the attempt to bind to MP was successful. If the attempt does not fail, then the DPM 600 is considered the master as indicated by block 706. In this case, the DPM 600 is the first DPM to attempt to bind to the MP since startup, reset or initialization. Operation proceeds to next block 708, where the DPM 600 updates the DPM.CFG file with information about the DPM 600.

The DPM 600 then reads the DPM.CFG file at next block 710 to determine the presence of other DPMs. For each DPM that is found via the DPM.CFG file, the DPM 600 reads the corresponding EXxxxxxx.CFG file at block 712. FIG. 5 shows three such files, EX111111.CFG, EX222222.CFG and EXmmmmmm.CFG. Of course, it is not necessary to read the EXmmmmmm.CFG file if the DPM 600 represents the DPM 502. The DPM 600 uses a ConfigurationID value located in a corresponding DPM-Record structure to locate and read a corresponding EXxxxxxx.CFG file of a corresponding DPM. Each EXxxxxxx.CFG file contains the information required to perform proxy operations to that DPM. Operation of the initialization is then complete for the new master DPM, which then performs proxy functions for other DPMs in the system.

Referring back to decision block 704, if the attempt to bind to the MP fails, indicating that another DPM is master, then the DPM 600 becomes a secondary DPM as indicated by block 720. Operation proceeds to block 722, where the DPM 600 queries the O/S 510 to bind to an available internal port at next block 724. The DPM 600 then updates the DPM.CFG with information specific to the secondary DPM 600. Operation then proceeds to block 726, where the secondary DPM 600 performs a notify proxy operation to notify the master DPM of the presence of the DPM 600. In a specific embodiment, the notify proxy is performed by executing an HTTP GET to the port MP of the HMMD 110. The URL supplied for this GET operation is "Proxy/Registration", which informs the master DPM of the presence of the DPM 600. The master DPM then accesses the DPM.CFG file and the corresponding EXxxxxxx.CFG file to learn specific information about the DPM 600 for performing proxy operations. Operation then proceeds to block 728, where the DPM 600 initiates operation of the watchdog logic 620, and initialization is completed.

Figure 7B:
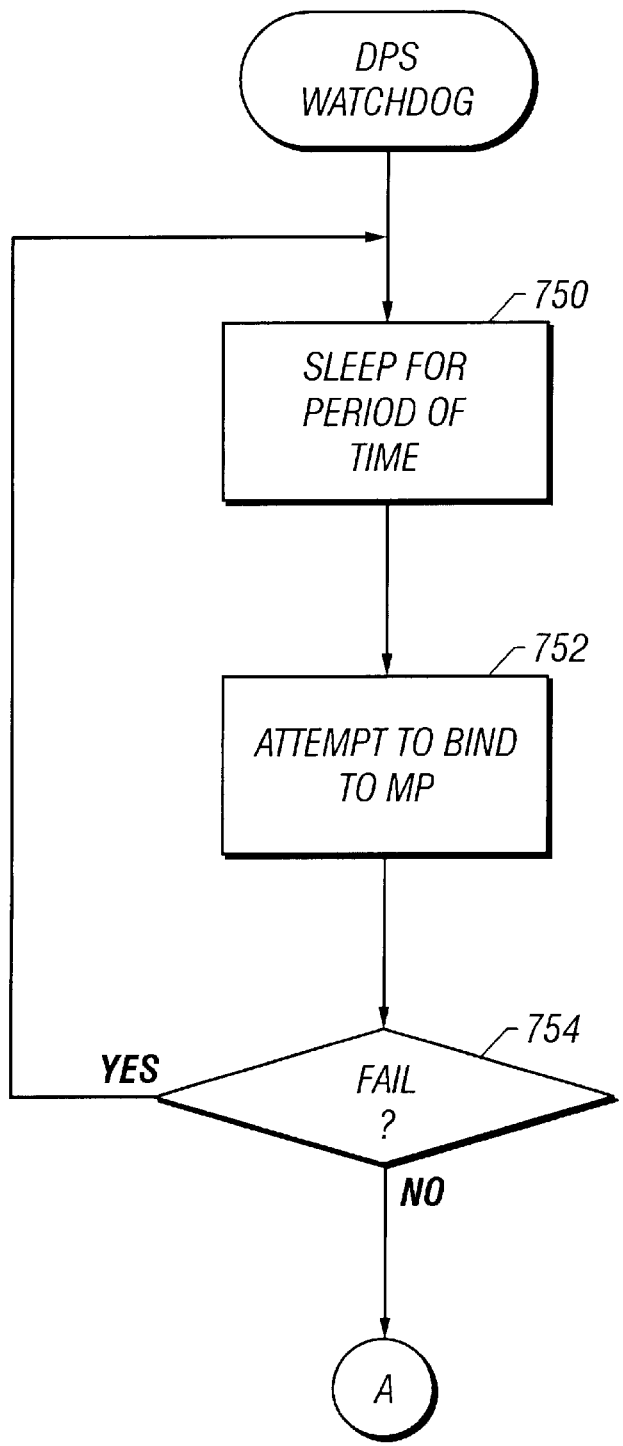
FIG. 7B is a flowchart illustrating operation of watchdog logic executed by every secondary DPM.

FIG. 7B illustrates operation of the watchdog logic 620 as initiated at block 728 of every secondary DPM. At first block 750, the watchdog logic 620 sleeps for a predetermined period of time, such as one (1) second or any other suitable time period. This function may be performed using any one of several methods, such as setting a watchdog timer (not shown) or the like. When the watchdog logic wakes up or is interrupted by expiration of the timer, operation proceeds to next block 752, where the watchdog logic 620 instructs the server logic 610 to attempt to bind to the MP once again. If the attempt fails as determined in the decision block 754, operation returns to block 750, at which the watchdog logic 750 goes back to sleep for the predetermined time period. Operation continues to loop between blocks 750 and 752 for each secondary DPM while another DPM is a master that retains control of the MP.

If the attempt to bind to the MP is successful as determined at decision block 754, then operation proceeds to block 710 (FIG. 7A), as previously described, where the accessing a single master port (MP), such as a specific TCP port, using an appropriate protocol, such as the HTTP protocol. The MP may be assigned any valid port number. The internal ports (IP) are assigned from a range of available ports, such as, for example, 49400–49600, although this depends upon the particular embodiment, configuration and/or manufacturer.

The following is an exemplary DPM.CFG file, which includes one configuration header structure (CFGHeader) and "n" DPM record structures (DPMRecord), where n is the total number of active DPMs:

```
// Configuration file, DPM.CFG structure definitions
struct CFGHeader                      // One header structure at the start of the DPM.CFG file
{
    int Size;                         // size of this structure for version/validity checking
    char SystemName[64];              // name of the system, used to make sure the configuration
                                      is
                                      valid for the specific system
    char DeviceId[64];                // convenient place to save the management server device
                                      id
                                      so that all DPM's can get to it
    int LastUser;                     // convenient place to save the last user id assigned so that
                                      all
                                      DPM's can get to it
    int LastUpdatedTime;              // last time the configuration file was updated, ie. last user
                                      changed
    int CompSysConfigurationId;       // convenient place to save the CompSys configuration id,
                                      used
                                      to invalidate the cookies outstanding
};
struct DPMRecord                      // One for each DPM
{
    int Size;                         // size of this structure for version/validity checking
    char Name[260];                   // name of the DPM, must be unique
    int ConfigurationId;              // convenient place to save the DPM configuration id so that
                                      all DPM's can get to it
    int Port;                         // port last used by the DPM, may be 0 if a dynamic swap
                                      has occurred
    int Time;                         // last time the record was updated
    char Reserved[64];                // currently this is reserved
    int Condition;                    // condition of the DPM, online/offline/etc . . .
    int Status;                       // status of the DPM, ok/warning/failed/etc . . .
};
```

DPM 600 reads the DPM.CFG file. In this case, the DPM 600 becomes the new master DPM as indicated by block 706 and performs the operation at block 712. In this manner, at least one and up to all of the secondary DPMs periodically query the MP to determine if it is still in use. If the current DPM master fails or drops out, one of the remaining secondary DPMs binds to the MP and becomes the new master.

It is appreciated from the Figures and above description that the population of DPM's that are loaded on a system dynamically self organize to provide single port access to all FPC's that are active on the system, such as the HMMD 110. The first DPM loaded serves as the master DPM, which performs proxy server functions for all other DPM's loaded on the system, such as according to HTTP. Subsequent DPMs detect the presence of the DPM master (or the unavailability of the MP), and load as secondary DPMs. The secondary DPMs each include watchdog logic that periodically tests the MP port in the event the master DPM drops out, is unloaded or fails. Any of the DPMs, including the master DPM, may be dynamically loaded and unloaded during the operation of the HMMD 110. The loading and unloading of a given DPM does not disturb the operation of other DPMs. Communication with all FPCs is conducted by The following is an exemplary EXxxxxxx.CFG file:

```
struct HMMOIsapiReference
{
    // **********************************************
    // NOTE: from here to the end banner MUST be identical to:
    //
    //      struct HMMOIsapiExtension
    //
    // defined in hmmoinf.h
    // **********************************************
    int Size;               // size of this structure, used for
                            // serialization and versioning
    char Name[260];         // must be unique, used as URL alias
    char File[260];         // contains the file name of this extension, this should
                            // be an absolute location if present since it will be
                            // used to do a load library call
    char Script[260];       // contains the script name of this extension
                            // it may be 0 if a DLL is not associated with this
                            // extension, i.e. it is an embedded extension
    // url addressing is based on the value below. a url is resolved to a
    // local file name within an ECB by using the HSE_REQ_MAP_URL_TO_PATH
    // support function. for example if a request is derived from the following
    // HMMOConfiguration and HMMOIsapiReference structure elements;
    //
    // HMMOIsapiReference.UrlBase = C:/MyUrlBase
    // HMMOIsapiReference.Name = MyName
    //
    // a direct address of;
    //      http://www.host.com/scripts/doit.dll/dir/file?parameter(s)
    //
    // or an alias address of;
    //      http://www.host.com/doit/dir/file?parameter(s)
    //
    // would expect the extension to be in;
    //      C:/MyUrlBase/scripts/doit.dll
    //
    // would provide the url to the extension as;
    //      /MyName/dir/file?parameter(s)
    //
    // and would fetch the file as;
    //      C:/MyUrlBase/dir/file
    //
    char UrlBase[260];      // absolute directory base for locating files served
                            // by this extension, all non-executable files must
                            // be relative to this directory
    unsigned long Flags;    // operational flags for extension features
                            // currently only a single feature is defined;
                            // ISAPI_ALLOW_RAW
    // the HMMO structures are optional and help form the basis of the
    // the following for the extension;
    //      home page
    //      security mechanism
    //      consolidated status reporting
    int DescriptionCount;                   // number of elements in description
    struct HMMOMessage *Description;        // description of this instance
    int PropertiesCount;                    // number of elements in properties
    struct HMMOPropertyList *Properties;    // property access list
    int StatusCount;                        // number of elements in status
    struct HMMOStatusList *Status;          // status list
    // ISAPI function pointers for this instance of the HMMO, Version or
    // Termination may be 0, if a version is not supplied or if cleanup
    // on termination is not necessary, a 0 value for Process is considered
    // a nonsense condition and the extension is ignored.
    PFN_GETEXTENSIONVERSION Version;        // called when the server starts up
                                            // to determine version information
                                            // may be 0
    PFN_HTTPEXTENSIONPROC Process;          // called when a request is received
                                            // to process the request
                                            // may be 0 if FileName is set
    PFN_TERMINATEEXTENSION Termination;     // called when the server is stopping
                                            // may be 0
    // **********************************************
    // NOTE: from the beginning banner to here MUST be identical to:
    //
    //      struct HMMOIsapiExtension
    //
    // defined in hmmoinf.h
    // **********************************************
```

-continued

```
// any parameters unique to the reference structure should be placed
// starting here
    struct HMMOIsapiReference *Next;  // pointer to next active extension
    unsigned long Handle;              // contains the handle to a loaded extension,
                                       // if it is 0, then the extension is either
                                       // bound or unloaded, depending on the
                                       // whether the function pointers are valid
    HSE_VERSION_INFO IsapiVersion;     // contains the version information that
                                       // is returned from the Version call,
                                       // initially 0
    char Redirect[60];                 // this is a proxy redirect, if present, the name
                                       // is concatenated to it to form a proper name for
                                       // look up in the extension list, it is derived
                                       // from HostInetAddress and HostInetPort as;
                                       // '/HostInetAddress/HostInetPort
                                       // any '.' in the redirect will be converted
                                       // to '_'
// the following parameters are provided when the registered extension
// is not an, in process extension, but is another instance of an
// HMMO running at a different port
    char DeviceId[64];                 // unique identifier for this HMMD, necessary
                                       // since the internet name and addresses may
                                       // be subject to change, once this is set,
                                       // it must be constant
    char ExtensionId[260];             // unique identifier for this ISAPI extension,
                                       // necessary since the ip address or port for
                                       // a specific extension may change, once this is
                                       // set, it must be constant
    char HostName[260];                // net name from 'gethostname'
    char HostInetAddress[32];          // IP address; xxx.xxx.xxx.xxx
    char HostInetPort[8];              // IP port; xxxxx
};
```

It is noted that each EXxxxxxx.CFG file contains specific information about one of the DPMs. This information is used by the master DPM to enable it to perform proxy operations for each secondary DPM. The "xxxxxx" in the file name is derived from the "ConfigurationID" field in the DPMRecord for that DPM. The "xxxxxx" is a base32 encoding of the 32-bit value in the ConfigurationID located in the DPM.CFG file, where the base32 character set comprises the characters: 123456789ABCDEFGHJKLM-NOPQRSTVWXYZ. The base32 character set allows a normal 32-bit word to be represented in 6 characters rather than 8 digits as would otherwise be required for a hexadecimal character representation. The EXxxxxxx.CFG file illustrated above comprises a linked list of ISAPI references.

It is now appreciated that a the use of dynamic proxy servers (DPSs) within dynamic proxy modules (DPMs) provides a fault tolerant design that leverages operating system mechanisms to allow for graceful removal of any DPM with programming errors from a management system without impacting the other DPMs. The use of dynamic proxy servers provides a flexible management system that allows loading and unloading of different functional processing components (FPCs), such as fault management, configuration management, software distribution, etc., without the need for a fixed configuration or administration of the DPMs and without disrupting system operation.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A dynamic proxy server, comprising:

client logic that is capable of communicating with at least one server module via an internal port;

proxy logic that is capable of communicating with the at least one server module via the client logic; and server logic including a socket that attempts to bind the socket to a master port, wherein if the attempt to bind the socket to the master port is successful, the server logic operates to proxy communications between the at least one server module and the master port via the proxy logic, and if the attempt to bind the socket to the master port is unsuccessful, the server logic binds the socket to an internal port.

2. The dynamic proxy server of claim 1 for enabling communication between the socket and a functional processing component, further comprising:

dispatch logic that interfaces the server logic to enable communications between the server logic and the functional processing component.

3. The dynamic proxy server of claim 2, wherein the interface between the dispatch logic and the functional processing component comprises an internet server application programming interface.

4. The dynamic proxy server of claim 1 for communicating with a plurality of server modules that are bound to a corresponding plurality of internal ports when the socket is bound to the master port, further comprising:

the client logic capable of communicating with the plurality of server modules via the corresponding internal ports;

the proxy logic capable of communicating with the plurality of server modules via the client logic; and the server logic operating to proxy communications between the plurality of server modules and the master port via the proxy logic.

5. The dynamic proxy server of claim 4, further comprising:
the proxy logic writing presence information into memory upon initialization, the memory including presence information about each of the plurality of server modules; and
the proxy logic reading the memory if the server logic binds the socket to the master port to identify the presence of each of the plurality of server modules.

6. The dynamic proxy server of claim 4, further comprising:
the proxy logic writing communication information into memory upon initialization, the memory including communication information about each of the plurality of server modules; and
the proxy logic reading the memory if the server logic binds the socket to the master port to enable proxy communications for the plurality of server modules.

7. The dynamic proxy server of claim 1, further comprising:
watchdog logic that causes the server logic to periodically attempt to bind the socket to the master port if the socket is bound to an internal port.

8. The dynamic proxy server of claim 1, wherein the server logic and the client logic each operate according to hypertext transfer protocol.

9. The dynamic proxy server of claim 1, wherein the master port and each of the internal ports comprise transmission control protocol ports.

10. A communication system, comprising:
a master port;
a plurality of internal ports; and
a plurality of dynamic proxy servers, each comprising:
client logic that is capable of communicating with any of the plurality of dynamic proxy servers that are bound to any of the plurality of internal ports;
proxy logic that is capable of communicating, via the client logic, with any of the plurality of dynamic proxy servers that are bound to any of the plurality of internal ports; and
server logic, interfacing the proxy logic and including a socket, that attempts to bind the socket to the master port, wherein if the attempt to bind the socket to the master port is successful, the server logic operates to proxy communications, via the proxy logic, between the master port and any of the plurality of dynamic proxy servers that are bound to any of the plurality of internal ports, and if the attempt to bind the socket to the master port is unsuccessful, the server logic binds the socket to one of the plurality of internal ports.

11. The communication system of claim 10, further comprising:
an operating system that controls access to the master port and that grants exclusive access to the master port to a first of the plurality of dynamic proxy servers.

12. The communication system of claim 10, further comprising:
a memory that stores a configuration file; and
each of the dynamic proxy servers, upon initialization, updating the configuration file to provide presence information.

13. The communication system of claim 12, further comprising:
one of the plurality of dynamic proxy servers binding its socket to the master port and reading the configuration file to determine the presence of every other one of the plurality of dynamic proxy servers.

14. The communication system of claim 12, further comprising:
each of the plurality of dynamic proxy servers, upon initialization, updating the configuration file to provide access information; and
one of the plurality of dynamic proxy servers binding its socket to the master port and reading the configuration file to enable proxy server communications for every other one of the plurality of dynamic proxy servers.

15. The communication system of claim 10, wherein each of the plurality of dynamic proxy servers further comprises:
watchdog logic that periodically causes the server logic to attempt to bind the socket to the master port.

16. The communication system of claim 10 including a plurality of functional processing components, wherein each of the plurality of dynamic proxy servers further comprises:
dispatch logic that interfaces the server logic to transfer communications between the server logic and a corresponding one of the plurality of functional processing components.

17. The communication system of claim 10, further comprising:
the server logic and the client logic of each of the plurality of dynamic proxy servers operating according to hypertext transfer protocol; and
the master port and each of the plurality of internal ports comprising transmission control protocol ports.

18. A method of providing proxy communications between a master port, a plurality of internal ports and a plurality of proxy servers, each proxy server including server logic, proxy logic and client logic, comprising:
each of the plurality of proxy servers attempting to bind its server logic to the master port;
if successful at binding to the master port, a master proxy server operating to proxy communications, via its proxy logic and its client logic, between the master port and any of the plurality of dynamic proxy servers that are bound to any of the plurality of internal ports; and
if not successful at binding to the master port, binding to one of the internal ports and communicating via that internal port.

19. The method of claim 18, further including a plurality of functional processing components and each of the plurality of proxy servers including dispatch logic, further comprising:
each of the plurality of proxy servers enabling communication between its server logic and a corresponding one of the plurality of functional processing components via its dispatch logic.

20. The method of claim 18, further comprising:
each of the plurality of proxy servers periodically attempting to bind its server logic to the master port if bound to an internal port.

* * * * *